Patented Sept. 16, 1941

2,256,349

UNITED STATES PATENT OFFICE 2,256,349

ART OF PREPARING DERIVATIVES OF ANACARDIC ACID

Emil E. Novotny, Oak Lane, and George Karl Vogelsang, Frankford, Pa., assignors to Durite Plastics, Incorporated, Philadelphia, Pa., a corporation of Pennsylvania No Drawing. Application September 23, 1937, Serial No. 165,332

12 Claims. (Cl. 260—46)

This invention relates to the art of preparing derivatives of anacardic acid, and has particular reference to the reaction products of anacardic acid or materials containing or derived from anacardic acid with one or more nitro-compounds.

The primary object of the invention is to provide a new and very useful class of nitrogen containing reaction products of anacardic acid.

Another object is to provide a practical and economical process for the preparation of nitrogen containing reaction products of anacardic acid.

Another object is to provide a new and very useful class of substances which are infusible, insoluble and unaffected by acids, alkalies and solvents, and which because of these characteristics are eminently suitable for certain important applications in the industries.

Another object is to provide a new class of compositions which are particularly well suited for the manufacture of abrasive wheels, brake bands, clutch facings, etc. as well as to provide a practical and economical method for the preparation of such compositions on a large commercial scale.

Briefly stated, the method of preparing nitrogen containing reaction products of anacardic acid in accordance with this invention consists in heating anacardic acid or materials containing or derived from anacardic acid under suitably controlled reaction conditions with one or more nitro-compounds.

In our process, we may employ anacardic acid itself but we prefer to use the shell liquids of the cashew nut (Cnsl) which consist chiefly of anacardic acid (about 90%). Either the raw shell liquids of commerce or the preheated liquids may be employed. If the raw liquids are used, it has been found advantageous to subject them to a preheating before adding the nitro-compounds. This may be conveniently accomplished by heating the Cnsl gradually to about 500° F.

Instead of anacardic acid or Cnsl, we may employ certain derivatives of Cnsl as well as certain derivatives of anacardic acid. As examples of suitable derivatives may be mentioned the crude or purified esterification products prepared in accordance with our copending application Serial No. 149,098 filed June 17, 1937, and the amine derivatives prepared according to the disclosure of our copending application Serial No. 157,394 filed August 4, 1937.

In the following description and claims, the term "fusible anacardic material" will be used to include not only anacardic acid itself but also materials containing appreciable amounts of anacardic acid as well as fusible materials derived from either cashew nut shell liquid or anacardic acid.

The nitro-compounds which are suitable for reaction with anacardic acid in accordance with the teachings of the present invention are restricted to those which are characterized by stability to moderate heat and which do not react with explosive violence. The aliphatic nitro-compounds and poly-nitro-compounds are generally unsuited for our purposes. The most suitable reagents are those which possess a ring structure, either aromatic or heterocyclic, and which contain a single nitro-group with or without another substituting group in the molecule. As examples of suitable reagents may be mentioned the mono-nitro derivatives of benzene, of the toluenes, of the xylenes, of naphthalene and of furan. The foregoing materials are particularly suitable because of their relative stability and their ready availability in large quantities at comparatively low prices.

The proportions of the reagents and the specific details of procedure depend to some extent on the particular reagents employed in the process. Catalysts may be used, if desired, to speed up the reaction; otherwise the reagents react very slowly. However, catalysts are not wholly indispensable as satisfactory products may be produced on a commercial scale without their use.

Generally speaking, it may be stated that substances of an acidic nature or substances which are capable of liberating acidic materials are suitable as catalysts. As examples of suitable catalysts may be mentioned inorganic acids such as sulphurous, sulphuric, hydrochloric, hydrobromic and phosphoric acid, and organic acids such as acetic, mono-chloracetic, di-chloracetic, tri-chloracetic, citric, fumaric, glycollic, lactic, maleic, oxalic, oxybutyric, succinic, di-chlorsuccinic, phenol sulphonic, phenyl sulphonic, benzene sulphonic and ethyl sulphuric acid. As additional examples may be mentioned the alkyl derivatives of sulphuric acid such as diethyl sulphate, and the various organic chlorides such as acetyl chloride, propyl chloride, propionyl chloride, phthalyl chloride, dichlor-succinic anhydride, dichlormaleic anhydride, succinyl chloride and phosgene.

The following is a typical procedure for making a reaction product of the present invention:

Cnsl is mixed with a nitro-compound corresponding to the desired reaction product of anacardic acid in at least molecular proportions. The reagents appear to combine in substantially their molecular weights, the molecular weight of anacardic acid being approximately 344 and that of Cnsl may be considered as being about 400. In order to obtain a complete reaction, it is preferable to have an excess of the nitro-compound. The amount of the excess depends upon the boiling point of the nitro-compound, the excess being about 10% in the case of the less readily distillable nitro-compounds and considerably greater in the case of the more readily distillable compounds.

The reagents are heated to as high a temperature as possible in order to induce and to carry the reaction to completion, for in the absence of catalysts the velocity of the reaction is very low. The optimum temperature appears to be that of the boiling point of the mixture of reagents. The use of catalysts such as have been listed materially assists the reaction and causes it to go to completion in much shorter time than it would otherwise require. In the case of nitrobenzene and Cnsl without a catalyst, the reaction can be carried to completion in from 24 to 72 hours utilizing a temperature of about 300° F. The time can be reduced considerably by raising the temperature or by employing catalysts or by the use of both expedients. The excess reagent may be removed by extraction or vacuum distillation.

A variation in the foregoing illustrative method consists in refluxing the mixture of reagents for a short time and then to subject the mixture to distillation in such a manner that the water distils off and the temperature rises to that of the boiling point of the mixture. When the temperature reaches this point, the material may be refluxed until a black, rubbery, infusible and insoluble material is obtained, and where there remains a surplus of unreacted nitro-compounds, they may be distilled off, leaving behind a material that will be substantially free of excess reagents.

In the case of nitro-compounds having comparatively high boiling points, it is possible to employ temperatures as high as 500° F. but care is necessary to avoid a violent reaction. It is also advisable in this case to employ a preheated shell liquid. As has been stated, the preheating may be carried out as a preliminary treatment at about 500° F. before mixing the reagents.

The foregoing illustrative methods are carried out at atmospheric pressures. Pressures above atmospheric may be employed and are particularly desirable when using relatively volatile nitro-compounds. The pressures need not for most practical purposes exceed ten atmospheres, though we are not precluded from utilizing much higher pressures.

The reaction products of the present invention are characterized by a number of very unique properties which render them eminently suitable for a large number of useful applications in the industries. They are black, rubbery, stringy, infusible materials and are apparently unaffected by acids, alkalies, acids and organic solvents. When freed of excess reagents, they are substantially odorless and tasteless. They do not appear to be affected by temperatures in excess of 300° F. and can be heated up to 1000° F. without any appreciable decomposition. In addition to the foregoing properties, they possess relatively high frictional coefficients and dielectric strengths. They can withstand high potentials including those of the electric arc without carbonization.

The reaction products of the present invention are particularly well adapted for use as fillers in molding compositions, especially those which are composed in whole or in part of synthetic resins or rubber. They may be used instead of or in addition to the other fillers which are generally used in molding compounds. Thus, they may be used instead of or in addition to mineral or vegetable fillers such as asbestos, wood flour, walnut shell flour, etc. As examples of synthetic resins with which the materials of the present invention may be used as fillers may be mentioned the condensation products of phenols with aldehydes, carbohydrates, ketones and polyhydric alcohols, the condensation products of urea or thiourea with aldehydes, the vinyl resins, the resins of the "glyptal" or alkyd type, and the resins derived from Cnsl. The reaction products have the decided advantage over other fillers such as asbestos of having lower specific gravities. The reaction products may be incorporated with the synthetic resins in various ways and in widely varying proportions. For instance, they may be mixed with as little as 10% to as much as 200% of the resin, depending upon the desired characteristics and intended use of the final composition.

The reaction products and the resin which should be in a fusible form are thoroughly mixed so that each particle of reaction product is thoroughly coated with the resin, which is to act as a binder for the particles of reaction product when the composition is pressed into shape. The mixing can be carried out in the presence or absence of liquids, which may serve as wetting agents or solvents for the synthetic resins. As suitable liquids may be mentioned water, various hydrocarbons, phenols, Cnsl, anacardic acid and derivatives of Cnsl or anacardic acid such as the amine derivatives or esterification products.

It is to be noted that phenol resins in their fusible state generally contain a certain residual amount of phenol. This residual phenol is of special benefit in the incorporation of the reaction products.

The incorporation of the reaction products may be carried out in various forms of equipment. For most practical purposes, the conventional form of mixer or blender will serve. If desired, the mixing apparatus may be heated. The operation also may be carried out on differential or sheeting rolls which may be heated. Cold or hot extrusion processes may also be employed for this purpose.

The reaction products of the present invention may be sold to the molder as such or they may be sold already incorporated with the synthetic resin. The molder may add other fillers, if he so desires, or may use the compound as purchased for either hot or cold molding.

The composition is particularly well adapted for the manufacture of articles whose use requirements are such as to specify high frictional coefficients, heat resistance and dielectric strength. Among such articles may be mentioned abrasive wheels, sand paper, brake linings, clutch facings, safety treads for tires and electrical insulation for high potential uses (X-ray, vacuum tube, etc.)

Compositions containing the reaction products of the present invention as fillers are also suitable for the manufacture of molded insulation for external power lines. Insulation made with the reaction products as fillers have superior insulating properties and will withstand weathering indefinitely, due among other things to the fact that the compositions are practically inert and do not absorb appreciable amounts of moisture.

The foregoing specification and description include the essential and distinctive thought of our invention, but it is to be distinctly understood that the same may be modified in various ways and/or combined with various other details without affecting the peculiar results obtained, and without departing from the spirit of the invention or the scope of the appended claims in which we intend to claim all the patentable novelty inherent in our invention.

We claim:

1. The method of preparing an infusible nitrogen-containing reaction product of anacardic material, which consists in heating a mixture of a fusible anacardic material and a mono-nitro-derivative of toluene to a temperature not substantially above the atmospheric boiling point of the mixture, and continuing the heating until an infusible product is obtained.

2. The method of preparing an infusible nitrogen-containing reaction product of anacardic material, which consists in heating a mixture of a fusible anacardic material and a mono-nitro-derivative of naphthalene to a temperature not substantially above the atmospheric boiling point of the mixture, and continuing the heating until an infusible product is obtained.

3. As a composition of matter, the infusible reaction product of a fusible anacardic material and a mono-nitro-derivative of toluene.

4. As a composition of matter, the infusible reaction product of a fusible anacardic material and a mono-nitro derivative of naphthalene.

5. The method of preparing an infusible nitrogen-containing reaction product of anacardic material, which consists in heating a mixture of a fusible anacardic material and an organic nitro-compound, which is sufficiently thermo-stable to permit its being heated per se to its boiling point at atmospheric pressure without exploding or otherwise undergoing appreciable decomposition, to a temperature not substantially above the atmospheric boiling point of the mixture, and continuing the heating until an infusible product is obtained.

6. The method of preparing an infusible nitrogen-containing reaction product of anacardic material, which consists in heating a mixture of a fusible anacardic material and a carbocyclic nitro-compound, which is sufficiently thermo-stable to permit its being heated per se to its boiling point at atmospheric pressure without exploding or otherwise undergoing appreciable decomposition, to a temperature not substantially above the atmospheric boiling point of the mixture, and continuing the heating until an infusible product is obtained.

7. The method of preparing an infusible nitrogen-containing reaction product of anacardic material, which consists in heating a mixture of a fusible anacardic material and a nitro-derivative of an aromatic hydrocarbon, which is sufficiently thermo-stable to permit its being heated per se to its boiling point at atmospheric pressure without exploding or otherwise undergoing appreciable decomposition, to a temperature not substantially above the atmospheric boiling point of the mixture, and continuing the heating until an infusible product is obtained.

8. The method of preparing an infusible nitrogen-containing reaction product of anacardic material, which consists in heating a mixture of a fusible anacardic material and an organic nitro-compound, which is sufficiently thermo-stable to permit its being heated per se to its boiling point at atmospheric pressure without exploding or otherwise undergoing appreciable decomposition, to a temperature not substantially above the atmospheric boiling point of the mixture in the presence of an acidic catalyst, and continuing the heating until an infusible product is obtained.

9. The method defined in claim 7, the nitro-compound being nitro-benzene.

10. As a composition of matter, the infusible reaction product of a fusible anacardic material and an organic nitro-compound, said nitro-compound being sufficiently thermo-stable to permit its being heated per se to its boiling point at atmospheric pressure without exploding or otherwise undergoing appreciable decomposition.

11. As a composition of matter, the infusible reaction product of a fusible anacardic material and an organic carbocyclic nitro-compound, said nitro-compound being sufficiently thermo-stable to permit its being heated per se to its boiling point at atmospheric pressure without exploding or otherwise undergoing appreciable decomposition.

12. As a composition of matter, the infusible reaction product of a fusible anacardic material and a nitro-derivative of an aromatic hydrocarbon, said nitro-derivative being sufficiently thermo-stable to permit its being heated per se to its boiling point at atmospheric pressure without exploding or otherwise undergoing appreciable decomposition.

EMIL E. NOVOTNY.
GEORGE KARL VOGELSANG.